(12) United States Patent
Ngai

(10) Patent No.: US 6,636,268 B1
(45) Date of Patent: Oct. 21, 2003

(54) VBI INSERTER

(75) Inventor: Hing Y. Ngai, Rancho Pales Verdes, CA (US)

(73) Assignee: Index Systems, Inc., Tortola (VG)

( * ) Notice: Subject to any disclaimer, the term of this patent is extended or adjusted under 35 U.S.C. 154(b) by 356 days.

(21) Appl. No.: 09/640,894

(22) Filed: Aug. 18, 2000

Related U.S. Application Data

(60) Provisional application No. 60/150,022, filed on Aug. 20, 1999.

(51) Int. Cl.[7] ............................. H04N 7/087; H04N 7/08
(52) U.S. Cl. ..................... 348/478; 348/473; 348/461
(58) Field of Search ................................. 348/473, 474, 348/476, 477, 478, 479, 464, 461, 467, 468; H04N 7/087, 7/08

(56) References Cited

U.S. PATENT DOCUMENTS

| | | | |
|---|---|---|---|
| 4,426,698 A | | 1/1984 | Pargee, Jr. |
| 4,536,791 A | | 8/1985 | Campbell et al. |
| 5,524,001 A | | 6/1996 | Beaudry et al. ............... 370/73 |
| 5,907,366 A | * | 5/1999 | Farmer et al. ............... 348/478 |
| 6,064,440 A | | 5/2000 | Born et al. ................... 348/478 |
| 6,160,587 A | * | 12/2000 | Walker et al. ............... 348/478 |
| 6,239,844 B1 | * | 5/2001 | Raiyat ........................ 348/468 |
| 6,262,775 B1 | * | 7/2001 | Kim ............................ 348/465 |
| 6,366,325 B1 | * | 4/2002 | Wang ......................... 348/465 |

OTHER PUBLICATIONS

Patent application 09/640,894, entitled VBI Inserter, filed Aug. 18, 2000, p. 3, line 14 to p. 5, line 28; p. 5, line 31 to p. 6, line 4; p. 6, line 28 to p. 10, line 10.
Copy of International Search Report, PCT/US00/22875, filed Aug. 18, 2000, 3 pages.

* cited by examiner

*Primary Examiner*—John Miller
*Assistant Examiner*—Trang U. Tran
(74) *Attorney, Agent, or Firm*—Christie, Parker & Hale, LLP

(57) ABSTRACT

A command controller reads and extracts predetermined key words and parameters from a configuration file. The command controller inserts digital data into a television signal according to the extracted predetermined key words and parameters. The command controller initiates a self-recovery operation to purge stored data and re-initialize the VBI inserter based on the extracted predetermined key words and parameters and time or access time. The command controller also extracts digital data from another video signal to be compared to stored diagnostic data or transmitted to another external source.

10 Claims, 5 Drawing Sheets

PRIOR ART

```
; Configuration file with comments
;
;
;
; Host definition
;
Host        WXYZ      8f52a       "Z Net"   5              1
;
;
; Dialback definition
Dialback  "1-800-386-7384"        "KABC1"   14:00:00 06:00:00    45           3
IgnoreLoopback      No
;
;
; Class definitions
;
PClass      XDS0      0           22
PClass      XDS2      2           22
PClass      IPlus0    0           16 17
PClass      IPlus1    1           16 17
SClass      IPlus2    2           16 17
;
;
;
; XDS packets
;
Packet      XDS0      XBreak      1-1-70    0:00:00   12-31-30   23:59:59    15   0
Packet      XDS2      XPID        1-1-70    0:00:00   12-31-30   23:59:59    -1   0
Packet      XDS2      XLength     1-1-70    0:00:00   12-31-30   23:59:59    -1   0
Packet      XDS2      XTitle      1-1-70    0:00:00   12-31-30   23:59:59    -1   0
Packet      XDS2      XNName      1-1-70    0:00:00   12-31-30   23:59:59     0   0
Packet      XDS2      XCLet       1-1-70    0:00:00   12-31-30   23:59:59     0   0
Packet      XDS2      XTime       1-1-70    0:00:00   12-31-30   23:59:59    -1   0
Packet      XDS2      XTZDST      1-1-70    0:00:00   12-31-30   23:59:59     0   0
;
;
; Index Plus+ packets
;
Packet      IPlus0    GClock      1-1-70    0:00:00   12-31-30   23:59:59    15   0
Packet      IPlus1    h0000.hs    1-1-70    0:00:00   12-31-30   23:59:59    80   0
Packet      IPlus1    h0000.zc    1-1-70    0:00:00   12-31-30   23:59:59    80   0
Packet      IPlus1    h0301.cm    1-1-70    0:00:00   12-31-30   23:59:59  1800   0
Packet      IPlus1    h0301.cms   1-1-70    0:00:00   12-31-30   23:59:59  1800   0
Packet      IPlus1    h0301.hs    1-1-70    0:00:00   12-31-30   23:59:59    80   0
Packet      IPlus1    h0301.sm    1-1-70    0:00:00   12-31-30   23:59:59    80   1
Packet      IPlus2    h0301.ss   12-31-30   2:00:00    1-1-70    3:00:00    -1   1
Packet      IPlus2    h0301.ss   12-31-30   8:00:00    1-1-70    9:00:00    -1   1
Packet      IPlus2    h0301.ss   12-31-30  14:00:00    1-1-70   15:00:00    -1   1
Packet      IPlus2    h0301.ss   12-31-30  20:00:00    1-1-70   21:00:00    -1   1
Packet      IPlus1    h0301.zc    1-1-70    0:00:00   12-31-30   23:59:59    80   0
```

FIG. 5

VBI INSERTER

CROSS-REFERENCE TO RELATED APPLICATIONS

This application claims the benefit of U.S. Provisional Application No. 60/150,022 filed Aug. 20, 1999, which is hereby incorporated by reference as if set forth in full herein.

BACKGROUND OF THE INVENTION

The present invention relates generally to digital data on television signals, in particular, to inserting digital data on any portion of the video signal and providing remote and diagnostic functions.

The transmission of information using television signals is well known. Specifically, an analog video/television signal includes a portion known as the Vertical Blanking Interval (VBI). As such, the VBI is used to transmit closed captioning, video/tv guides, and other such information. Such information is often provided as a digital data stream. A VBI inserter inserts the digital data stream into the VBI to be incorporated and transmitted with the video signal.

The VBI, however, has a limited bandwidth in terms of time and space. In other words, there is a limit in the amount of data that can be inserted into the VBI. Likewise, there is also a limit on the amount of time available for a VBI inserter to properly insert data into the VBI. Therefore, optimal use and management of the VBI bandwidth is desirable when data is inserted on the VBI.

Furthermore, data insertion sites, i.e., locations or sites for inserting data into the VBI using a VBI inserter are often distributed across a wide geographical range. Hence, physical or direct contact with a VBI inserter is often impractical. Therefore, the ability to remotely control a VBI inserter, exchange data, and obtain status reports of the VBI inserter is also desired.

SUMMARY OF THE INVENTION

The present invention provides a VBI inserter configured to insert digital data into a video signal and to provide remote and diagnostic functions.

In accordance with one aspect of the invention, a VBI inserter includes a video interface receiving a video signal and memory storing digital data and a configuration file. The VBI inserter also includes a command controller configured to extract operation data from the configuration file and insert stored digital data on the received video signal based on the extracted operation data, the extracted operation data including a key word and indicating a line of the video signal in an active portion of the video signal.

In another aspect of the invention, a method of inserting digital data on a video signal using a VBI inserter includes receiving digital data and a video signal, storing received digital data in memory and parsing a configuration file to identify a first key word. The method further includes determining a line within the video signal based on the identified first key word and incorporating digital data on the determined line of the video signal.

Many of the attendant features of this invention will be more readily appreciated as the same becomes better understood by reference to the following detailed description considered in connection with the accompanying drawings.

DESCRIPTION OF THE DRAWINGS

FIG. 5 illustrates a sample configuration file utilized by the VBI inserter.

DETAILED DESCRIPTION OF THE INVENTION

The VBI insertion system of the present invention provides a method and apparatus of interleaving the digital data stream in a nested or serial fashion on the VBI. As such, the VBI insertion system provides for an insertion of a variety of data types, scheduled in numerous ways to make optimal use of the VBI bandwidth. In one embodiment of the VBI insertion system, a software program, in conjunction with a configuration file and supporting programs, is used to handle numerous types of data and provides management over the VBI bandwidth.

Figure 1:
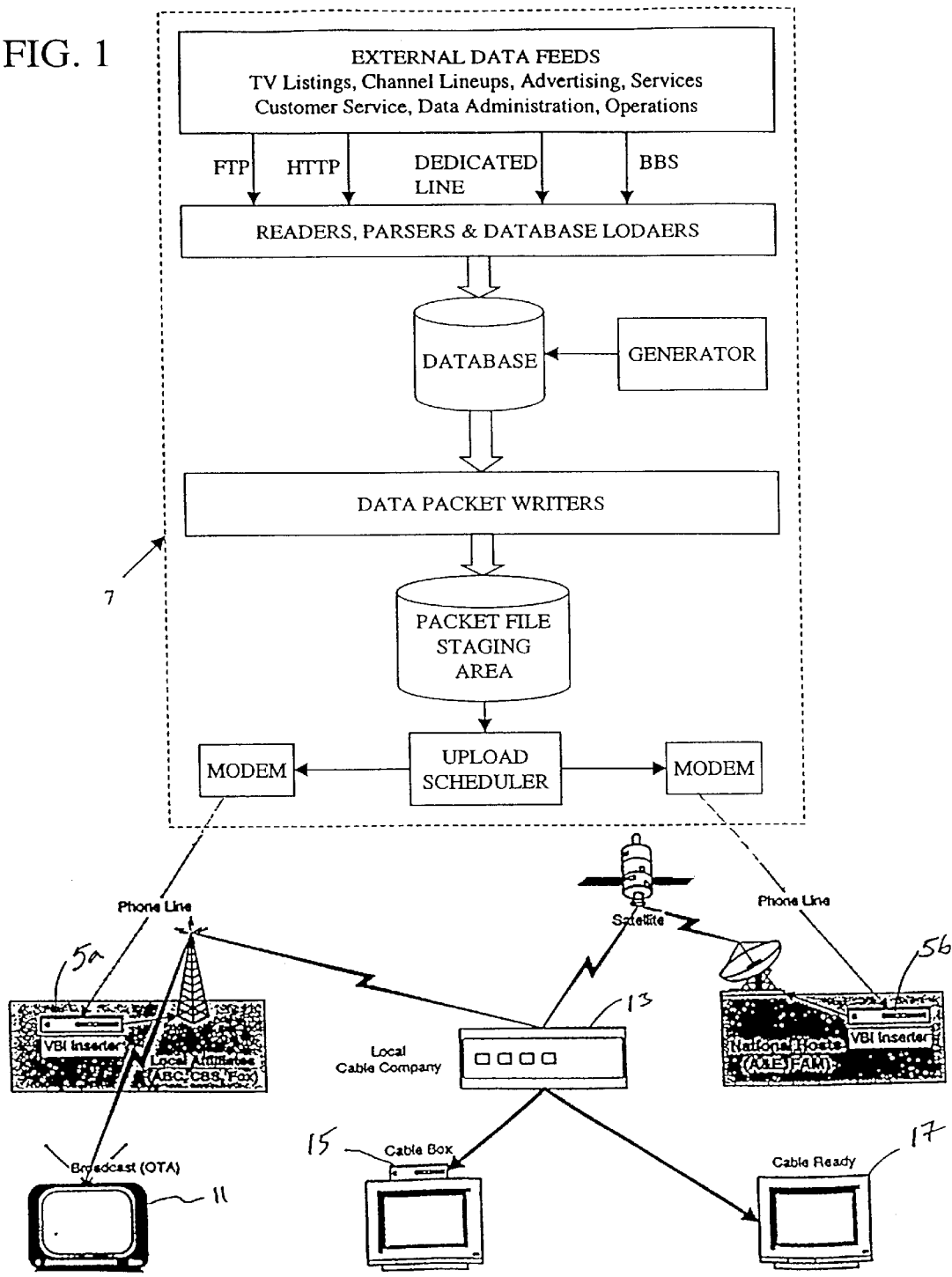
FIG. 1 illustrates a block diagram of a typical overall transmission and data insertion system.

FIG. 1 illustrates a block diagram of a typical VBI insertion system. Each receiver 11, 13, 15 and 17, fed-by a VBI Inserter 5a, 5b, receives data in certain time frames or limits (usually 3 seconds). This time limit allows receivers to skip VBI lines containing no or unuseable data. Additionally, by interleaving different types of data, certain products, e.g., receivers, are ensured to receive data they recognize and/or expect. Simply, the receivers are not "starved" of recognizable and/or expected data. The data is often in the form of packets. Each data packet starts and ends with special codes. A VBI inserter recognizes these start and end codes and inserts data packets continuously into the VBI.

Figure 2:
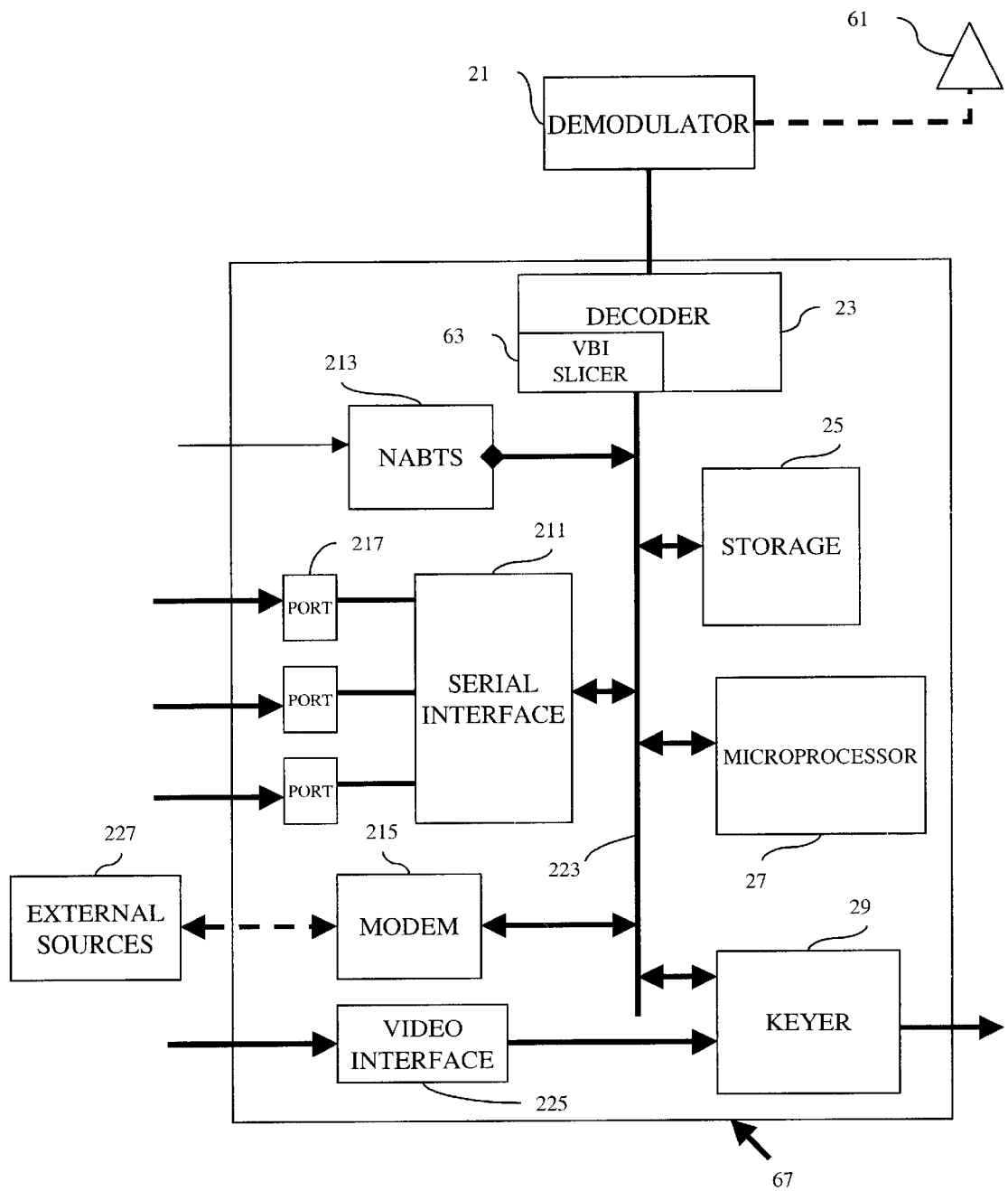
FIG. 2 illustrates a block diagram of a typical VBI inserter.

FIG. 2 illustrates a block diagram of a typical VBI inserter used within the VBI insertion system. The VBI inserter 67 contains a decoder 23, storage 25, microprocessor 27, keyer 29, serial interface 211, NABTS 213, and modem 215. The decoder 23 receives video input from a demodulator 21 which receives broadcast video signals. The decoder 23 contains a VBI slicer and extracts VBI data from the incoming video signal. The decoder 23 is coupled with a microprocessor 27 through a bus 223. The microprocessor 27 is programmed with software to direct or control other components within the VBI inserter to perform various functions. The software is stored in the storage 25. The storage 25 also houses other data such as the extracted data from the decoder 23. The serial interface 211 is connected to a number of serial data ports 217 such as conventional RS-232 ports. Through the serial ports 217, a computer is capable of being attached using an associated cable to provide digital stream input for insertion on the video signal. Additionally, the computer can externally control or monitor the VBI inserter.

The NABTS 213 is also able to receive data input for inserting a data on the video signal. Typically, the NABTS 213 is used to receive high speed data, such as teletext data, and properly format the data to be inserted on the video signal by keyer 29. The keyer 29 using a series of registers, firmware, and the software programmed in the processor 27 modulates digital data provided from the various data sources, serial interface 211, NABTS 213, and modem 215, to insert the data on the video signal. The modem 215 receives data from off-site information broadcasters and other external sources 227. The data provided to the modem 215 includes data to be inserted on the video signal and various command information to control, monitor and set up the VBI inserter. Video interface 225 receives video input from a service provider and the VBI inserter inserts data on the received video input.

Figure 3:
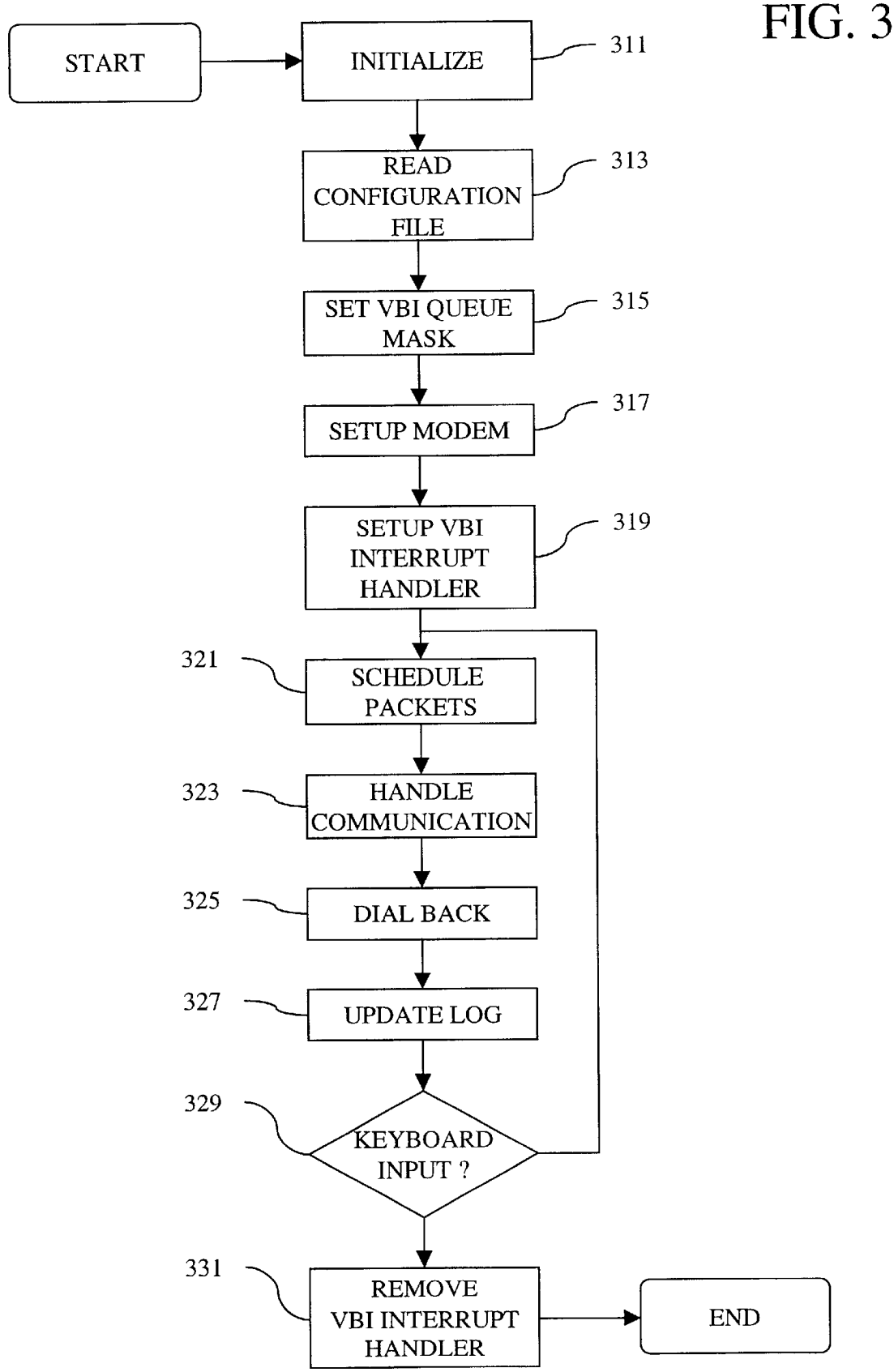
FIG. 3 illustrates a flow diagram of an operational overview of the VBI inserter of FIG. 2 programmed to insert data on the VBI.

FIG. 3 illustrates a flow diagram of an operational overview of the VBI inserter programmed to insert data on the VBI. The VBI inserter upon initially being powered up, through software executes initialization functions such as zeroing out or resetting registers or adjusting its internal clock (step 311). The VBI inserter reads and parses a portion of the configuration file and sets registers to place the VBI inserter in a particular initial state (step 313). The VBI inserter continues to read and parse the configuration file and stores the data in storage, such as RAM, to be used later to organize data packets to be inserted on the video signal (step 315). The VBI inserter performs set up functions to initialize the modem within the VBI. inserter so that-the modem is able to accept and receive calls from an external source (step 317). The VBI inserter also sets up an interrupt handler (step 319). Most of the components within the VBI inserter communicate with the microprocessor through the use of the interrupt handler. For instance, when the serial interface 211 receives data, the serial interface generates an interrupt to notify the microprocessor that data is available at the serial interface.

A looping process is started by the VBI inserter to schedule packets i.e. placing packets of data on the empty space of the VBI, in accordance with key words and associated parameters specified in the configuration file (step 321). Also, the VBI inserter allows communication from external sources or events, such as the modem answering an incoming call (step 323). The VBI inserter dials back to the external source if commanded or if setup to do so as indicated by the configuration file (step 325). An activity log is maintained by the VBI inserter that tracks the history, i.e. date, time, of any change in status experienced by the VBI inserter (step 327). Keyboard input causes the VBI inserter to halt the looping process and remove the interrupt handler (step 331). No Keyboard input allows the VBI inserter to continue the looping process repeating steps 321, 323, 325, and 327.

Figure 4:
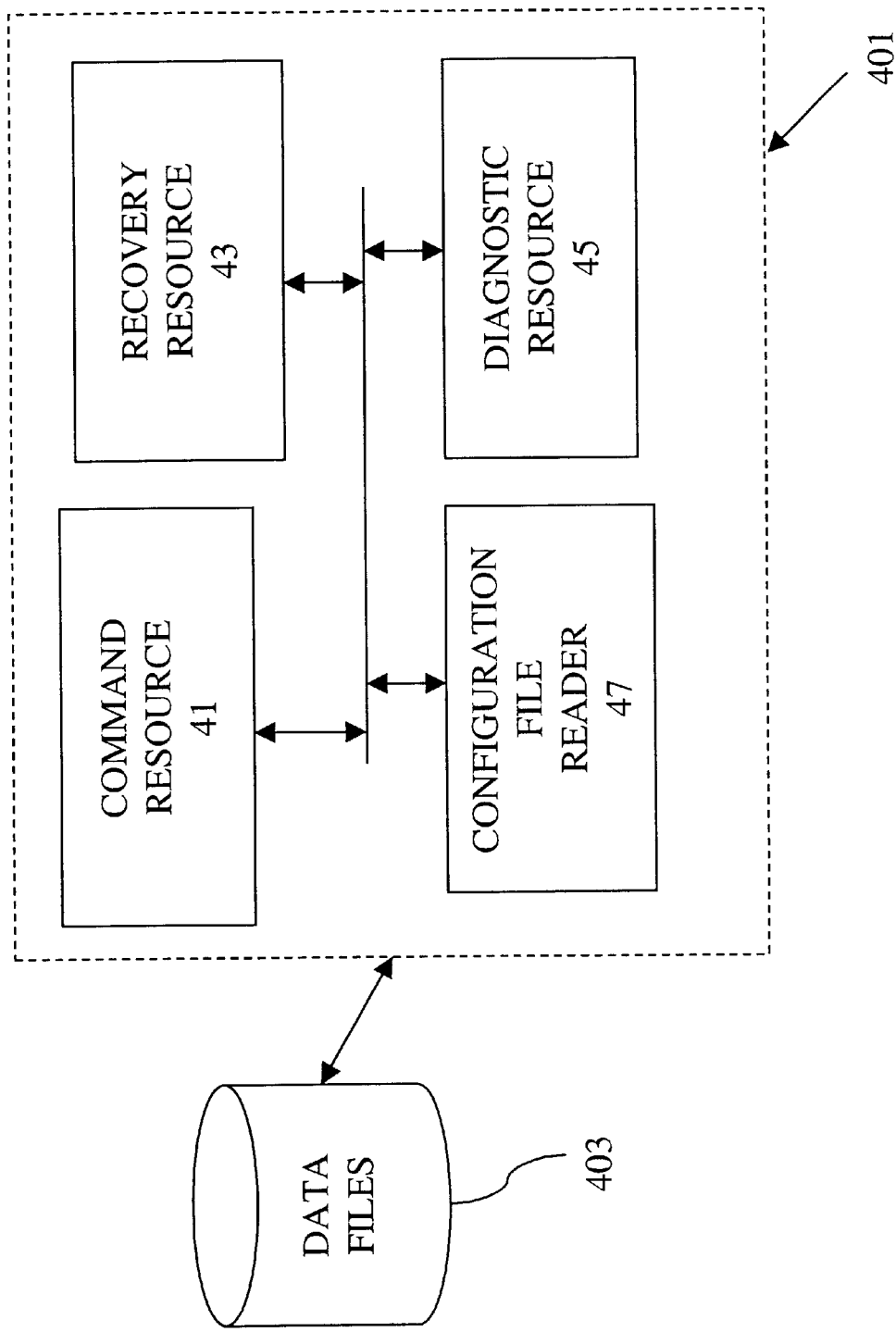
FIG. 4 illustrates a block diagram of one embodiment of a command controller of the VBI inserter of FIG. 2.

As shown in FIG. 4, the VBI inserter includes a command controller 401. The command controller operates the VBI inserter in the manner described in FIG. 3 and according to a configuration file stored in data storage 403. The command controller includes a command resource 41, a recovery resource 43, a diagnostic resource 45 and a configuration file reader 47. The recovery resource performs and monitors the VBI inserter to determine whether a self recovery is to be initiated. The diagnostic resource verifies that valid data is being inserted into the television signal. The configuration file reader reads and parses a configuration file and provides commands to the command resource. The command resource based on the commands received inserts data into the television signals at the appropriate times and in the proper order.

In one embodiment, the command resource, the recovery resource, the diagnostic resource and the configuration file reader comprise programs in C or C++ programming languages. C and C++ compilers and the uses thereof, are well known and often used by software developers. Furthermore, even though the command resource, the recovery resource, the diagnostic resource and the configuration file reader are described. as separate items, all the modules could be combined as a single program or hardwired in the VBI inserter, separately or as one.

A sample configuration file used to define the potential behaviors of inserting data on the video signal is illustrated in FIG. 5. The configuration file is not order dependent, but operates from key words added into the file. A key word is the first word on a line of text in the configuration file. Each line manipulates the way the data is inserted on the video signal.

A class key word 33 provides the grouping of data into specific categories 33a as well as specific data channels 33c. Therefore, this provides specific groups of data to be specifically inserted on predetermined data channels. These data channels number from 0–31 and correspond to the even and odd VBI fields within the VBI lines 10–25. Furthermore, the class definition allows the assignment of a priority level 33b to the categorized data. This allows important data or time constrained data such as GCLOCK to be inserted on the video signal without interruption. GCLOCKS generated by the VBI insertion system are important to the operation of many other devices that receive the video/VBI signal. GCLOCKS calibrate these devices. Therefore, data with the highest priority will be inserted onto the video signal prior to data with lower priority. Data with lower priority will not be inserted into the video signal until all of the higher priority data has been inserted.

For instance, setup data and electronic program guide (EPG) information data are two different types of data that compete for the same VBI bandwidth. The setup data is arranged into packets of different sizes and functions that contain information such as the service area definition (ZIP packets), program lineups (CM and CMS packets), timezone (TZ packets), call letters (SM packets), and EPG data download schedule (GHS packets). Setup data is available 24 hours a day. As such, a new user is able to setup her receiver at anytime. However, to save VBI bandwidth, the broadcast frequencies of the packets, the setup data, are different. Small packets such as ZIP, TZ and SM are broadcasted more frequently than the larger packets such as CM and CMS, because not only do the smaller packets expedite a user's setup process, but they are relatively small in size and thereby consume significantly less VBI bandwidth. The bigger packets (CM and CMS) are transmitted, as appropriate bandwidth becomes available.

On the other hand, EPG information data and other similar types of supporting data are broadcasted in fixed time slots. By broadcasting EPG information data in fixed time slots, this allows time slots not currently in use to be available to support other types of data from other potential data services. Furthermore, since EPG data is relatively static data, the performance from the user point of view, receiving the data, is not greatly effected. As a result, by categorizing the data and regulating the broadcast frequency of the data, optimal and flexible utilization of the VBI bandwidth is obtained.

Referring back to FIG. 5, a packet key word 35 within the configuration file defines the data source 37 of the data to be inserted on the video signal as well as the schedule or timing of inserting the data on the video signal. Furthermore, the packet key word associates the data to the class key word. The data source can be a specific file or a pointer or indicator of data which can be built by the software program. For example, ZIP packets, CM and CMS packets are encrypted data stored in specific files ready to be inserted. GCLOCK packets are generated by the software program from a calendar clock and miscellaneous information like DST. XDS data is generated by the software program from raw data files and from miscellaneous information like call letters and network names.

The software program accesses a XDS raw data file containing show information, which requires having the starting time, length, and title of the show, is inserted on the video signal. The raw data file is a plain text file. Each line of the raw data file contains all the information for a single show. These raw data files are created directly from a program listing file using a supporting program. Conversely, the raw data files are converted back to program listing data using a different supporting program. Also, in conjunction with a host key word 31 within the configuration file in which the host key word provides information about a broadcaster, the software program can then build network name, call letters, and time of day data packets to be inserted on the video signal.

The scheduling information 39 provided by the packet key word includes the start date 39*a* and start time 39*b* and the stop date 39*c* and stop time 39*d* for the scheduled insertion of the data on the video signal. Furthermore, within the scheduling information, an insertion period 39*e* is defined. For example, a specific number of seconds indicates that the data is to be inserted on the video signal repeatedly every specified number of seconds. In other words, 80 seconds could be specified and as such, data will be inserted on the video signal every 80 seconds. Furthermore, the insertion period defines having data created once and stored in buffers. Once stored in buffers, the data is repeatedly inserted on the video signal until the indicated stop date and time. This allows data that remains constant but requires to be repeatedly inserted to be efficiently inserted on the video signal by reducing repeated computations or formatting of the data. However, the data to be inserted in this fashion not only must remain constant, but cannot be interrupted.

The insertion period also provides that data is inserted repeatedly while still allowing that the content of the data to change as well as the insertion of the data to be interrupted. In other words, the data is inserted and once inserted, the data is immediately rescheduled to be inserted on the video signal again. Along with the insertion period, a data format can be defined to specify that data be inserted using the CC1x closed captioned waveform (two bytes per frame) or the CC2x EPG waveform (four bytes per frame).

Additionally, a password feature is provided for the VBI insertion system. A Password or key is configured to permit and not permit access to a VBI inserter. The password that is encrypted is changeable using the PASSWORD keyword in the configuration file. During login, i.e. accessing the VBI inserter, the VBI inserter is programmed to not check for the password in text, but to check an "encrypted password" generated by a password encryption program based on a human readable password in the configuration file. Therefore, both the password and the encryption program are needed if a new password is to be used to replace the existing one.

The above mentioned keywords and parameters are typically used by conventional VBI inserters and were provided for better understanding of the invention. However, the following keywords, parameters and related operations pertain to one embodiment of the VBI inserter of the present invention. In particular, a VBI block key word within the configuration file allows data to be inserted on other blocks of the video lines in addition to the conventional block of VBI lines 10–25. Therefore, this allows for the insertion of data on all the video lines including the VBI as well as the active video region. Hence, the amount data that is transmitted on the video signal is maximized.

A total of 525 lines of video, broken into even and odd fields, is supported for conventional video systems, e.g., televisions. A block represents 16 lines of video. Block 0 represents video lines 10–25 (VBI). Blocks 1–15 represent the rest of the lines of video 26–262. Thus, block 15 represents video lines 250–262.

In the configuration file, using the key word, VBIBlock followed by an integer defines a block number ranging from 0 to 15. The VBI inserter programmed to operate as illustrated in FIG. 3 parses the configuration file and identifies the VBIBlock keyword and the block number where data is to be inserted on the video signal. For instance, VBIBlock 1 indicates that data is to be inserted on video lines 26–41. As previously described, the class keyword specifically provides that specific groups of data are to be specifically inserted on predetermined data channels. With the VBIBlock keyword defined, an offset is provided to shift the position where data is to be inserted by the specified number of blocks (in terms of video lines). For example, by defining VBIBlock 1, the predetermined data channels defined by the class keyword, numbering from 0–31, correspond to the even and odd VBI fields within the video lines 26–41. Therefore, the VBI inserter is programmed to identify the class keyword and to offset the data channels defined by the class keyword in accordance with the VBIBlock definition.

In one embodiment, by using a line counter counting the number of video lines per screen, the VBI inserter inserts data when the line count equals the video line defined by the class and VBIBlock keyword. In another embodiment, by using a line counter counting the number of video lines per block and a block counter counting the blocks of lines, the VBI inserter inserts data when the line count and block count (making computations as needed) equals the video line defined by the class and VBIBlock keyword.

In another embodiment, the VBI inserter is programmed to operate using a command line interface. The command line interface accepts the line count information directly from an external source to determine where data is to be inserted on the video signal.

In addition to the flexible configuration file, the VBI insertion system also provides for remote communications. In the VBI insertion system, digital data is fed into and fetched by the VBI Inserters through the use of phone lines and modems. Also, the VBI Inserter is programmed remotely to provide for an insertion waveform shift on the VBI. An internal clock of a VBI Inserter and an offset of the internal clock is also programmed or adjusted remotely.

If for some reason remote access is disabled (modem lock up), i.e., RNC (Ring No Carrier), BUSY, etc., a self-recovery function is provided. Using an internal watchdog timer, the VBI Inserter determines whether the VBI Inserter has not been accessed for a predetermined period of time, e.g. two days. In one embodiment, a keyword, similar to VBIBlock described above, is added to the configuration file such that a keyword followed by a parameter sets the predetermined period of time. If the VBI Inserter has not been accessed for a predetermined period of time, the present invention resets itself and flushes all data. Therefore, the self-recovery feature prevents out-dated data from being inadvertently sent out.

In one embodiment, the VBI inserter contains a watchdog timer that marks the passage of time. The starting of the watchdog timer occurs under three conditions, a call from an external source to the VBI inserter (including a password and login received successfully), the VBI inserter is reset, and the VBI inserter initially powering up. If the watchdog timer marks that the predetermined period of time has passed since the occurrence of any of the before mentioned three conditions, the VBI inserter is programmed to reset itself. A cold boot is executed in which a specific value is written into a register causing the software of the VBI inserter to halt and restart. Also, from the command line or from the start of software of the VBI inserter program as illustrated in step 317 of FIG. 3, the VBI inserter is able to be reset, i.e., a cold boot executed.

In another embodiment, a keyword is placed within the configuration file followed by a date and time, e.g., REBOOT Jan. 1, 2010 21:15. The VBI inserter programmed to operate as illustrated in FIG. 3 parses the configuration file and identifies the keyword and the date and time in which the VBI inserter is to be restarted. Therefore, in one embodiment, if the watchdog timer marks that the date and time has occurred, the VBI inserter is programmed to reset, i.e., execute a cold boot.

Once the VBI inserter has executed a cold boot, all data resident in storage of the VBI inserter is removed. Thus, data must be replaced from an external source. Therefore, out-of-date data, the data in the VBI inserter that has not been updated for a predetermined period of time, is automatically purged and replaced. As a result, up-to-date data is maintained.

For diagnostic and trouble-shooting purposes, the present invention monitors raw data inputted into a monitor input of the VBI inserter. A report is constantly updated and raw log data is kept in a circular buffer for remote access. Hence, for diagnostic and trouble-shooting purposes, the raw log data is capable of being downloaded or retrieved remotely.

By monitoring the input of the VBI inserter, the video signal provided by, for example, a television station is examined to ensure that data is properly being inserted and transmitted. In one embodiment, the VBI inserter is capable of detecting valid unique data packets by examining the data on the video signal. Referring back to FIG. 2, an antenna 61 on a television station receives broadcasted video signals. The antenna 61 is coupled with the demodulator 21. The demodulator demodulates the broadcasted video signals and provides a video signal to the VBI inserter 67. Within the VBI inserter 67, the decoder using the VBI slicer 63, slices data from the video signal. In one embodiment, the data sliced is placed in a FIFO of fixed size to capture or hold the raw data extracted. When an external source, calls in through the modem 215, the VBI inserter provides a snapshot of the raw data, by copying the FIFO to a file and sends the file to the external source. The external source is then able to convert the file containing the raw data to a readable and comparable format to ensure the integrity of the data being inserted. In another embodiment, the data sliced is then compared to the expected data, e.g. private data, provided by an external source 227 through the modem 215 connected to the VBI inserter.

The VBI Inserter is also able to call back automatically reporting the VBI Inserter status to a remote site, if the VBI Inserter is specifically enabled to perform this call back procedure. If the VBI inserter is enabled to perform the call back procedure, the VBI inserter calls back an external source under three conditions/problems, no data is present; no data is being inserted; and no valid private data packets are present. When the VBI inserter calls an external source, the VBI inserter identifies itself using a series of call letters. A queue is created at the external source to receive and track the problems experienced by the calling VBI inserter. Each problem is handled one by one. New data is initially uploaded to the VBI inserter and solves a majority of problems experienced by the VBI inserters. If more drastic action is needed, then the external source is provided with escalated procedures such as paging a technician to resolve the problem.

What is claimed is:

1. A VBI inserter comprising:
video interface receiving a video signal;
memory storing digital data and a configuration file;
command controller configured to extract operation data from the configuration file and insert stored digital data on the received video signal based on the extracted operation data, the extracted operation data including a key word and indicating a line of the video signal in an active portion of the video signal;
a digital data interface configured to receive digital data and store the digital data in memory; and
wherein the command controller further comprises:
a configuration file reader configured to parse predetermined key words and associated parameters from the configuration file, and
a diagnostic resource configured to receive parsed key words and associated parameters from the configuration file reader and to determine a reset time period based on the received key words and parameters, the diagnostic resource further determines a current time and purges digital data stored in memory when the reset time period equals or exceeds the current time.

2. A VBI inserter comprising:
video interface receiving a video signal;
memory storing digital data and a configuration file;
command controller configured to extract operation data from the configuration file and insert stored digital data on the received video signal based on the extracted operation data, the extracted operation data including a key word and indicating a line of the video signal in an active portion of the video signal;
a digital data interface configured to receive digital data and store the digital data in memory;
a second video interface receiving a second video signal;
a second digital interface receiving diagnostic digital data; and
wherein the command controller further comprises a configuration file reader configured to parse predetermined key words and associated parameters from the configuration file, and the command controller is further configured to extract digital data in the second video signal and compares the extracted digital data to the received diagnostic digital data.

3. The VBI inserter of claim 2 wherein the command controller transmits an error message to an external source when the extracted digital data does not correspond to the received diagnostic digital data.

4. A VBI inserter comprising:
video interface receiving a video signal;
memory storing digital data and a configuration file;
command controller configured to extract operation data from the configuration file and insert stored digital data on the received video signal based on the extracted operation data, the extracted operation data including a key word and indicating a line of the video signal in an active portion of the video signal;
a digital data interface configured to receive digital data and store the digital data in memory;
a second video interface receiving a second video signal;
a second digital interface receiving diagnostic digital data; and wherein the command controller further comprises a configuration file reader configured to parse predetermined key words and associated parameters from the configuration file, and the command controller further configured to extract digital data in the second video signal and transmit the extracted digital data to an external source.

5. A method of inserting digital data on a video signal using a VBI inserter, the method comprising:

receiving digital data and a video signal;

storing received digital data in memory;

parsing a configuration file to identify a first key word;

determining a line of the video signal in an active portion of the video signal based on the identified first key word;

incorporating digital data on the determined line of the video signal in the active portion of the video signal;

parsing a configuration file to identify a second key word;

determining a reset time period based on the identified second key word;

determining current time; and purging digital data stored in memory when the reset time period equals or exceeds the current time.

6. A method of inserting digital data on a video signal using a VBI inserter, the method comprising:

receiving digital data and a video signal;

storing received digital data in memory;

parsing a configuration file to identify a first key word;

determining a line of the video signal in an active portion of the video signal based on the identified first key word;

incorporating digital data on the determined line of the video signal in the active portion of the video signal;

parsing a configuration file to identify a second key word;

determining a reset time period based on the identified second key word;

determining an access time period that identifies when a VBI inserter was last accessed; and purging digital data stored in memory when the reset time period equals or exceeds the access time period.

7. A method of inserting digital data on a video signal using a VBI inserter, the method comprising:

receiving digital data and a video signal;

storing received digital data in memory;

parsing a configuration file to identify a first key word;

determining a line of the video signal in an active portion of the video signal based on the identified first key word;

incorporating digital data on the determined line of the video signal in the active portion of the video signal;

receiving a second video signal and diagnostic digital data;

extracting digital data in the second video signal;

storing the digital data extracted and the diagnostic digital data received in memory; and comparing the extracted digital data to the received diagnostic digital data.

8. The method of claim 7 further comprising:

transmitting an error message to an external source when the extracted digital data does not correspond to the received diagnostic digital data.

9. A method of inserting digital data on a video signal using a VBI inserter, the method comprising:

receiving digital data and a video signal;

storing received digital data in memory;

parsing a configuration file to identify a first key word;

determining a line of the video signal in an active portion of the video signal based on the identified first key word;

incorporating digital data on the determined line of the video signal in the active portion of the video signal;

receiving a second video signal;

extracting digital data in the second video signal;

storing the digital data extracted; and transmitting the extracted digital data to an external source.

10. A VBI inserter comprising:

video interface receiving a video signal;

memory storing digital data and a configuration file;

command controller configured to extract operation data from the configuration file and insert stored digital data on the received video signal based on the extracted operation data, the extracted operation data including a key word and indicating a line of the video signal in an active portion of the video signal;

a digital data interface configured to receive digital data and store the digital data in memory; and wherein the command controller further comprises:

a configuration file reader configured to parse predetermined key words and associated parameters from the configuration file, and a diagnostic resource configured to receive parsed key words and associated parameters from the configuration file reader and to determine a reset time period based on the received key words and parameters, the diagnostic resource further determines an access time period that identifies when a VBI inserter was last accessed and purges digital data stored in memory when the reset time period equals or exceeds the access time period.

* * * * *